H. F. BREHM.
RENDERING TANK.
APPLICATION FILED MAY 26, 1911.
1,032,181.
Patented July 9, 1912.
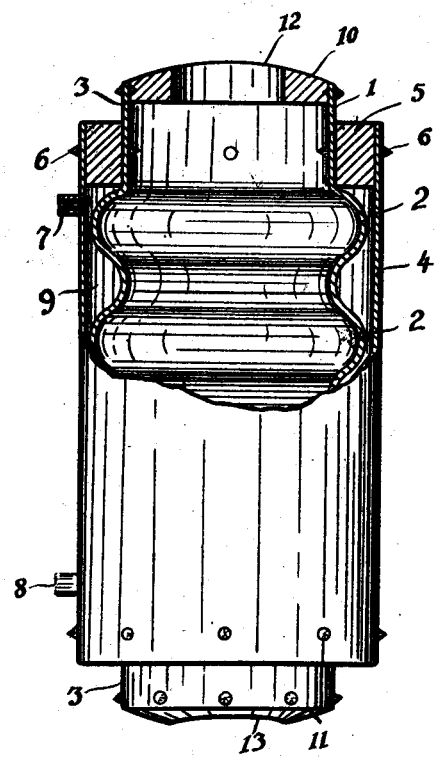

UNITED STATES PATENT OFFICE.

HERMAN F. BREHM, OF WATERLOO, NEW YORK.

RENDERING-TANK.

1,032,181. Specification of Letters Patent. Patented July 9, 1912.

Application filed May 26, 1911. Serial No. 629,743.

*To all whom it may concern:*

Be it known that I, HERMAN F. BREHM, a citizen of the United States, residing at Waterloo, in the county of Seneca and State of New York, have invented certain new and useful Improvements in Rendering-Tanks, of which the following is a specification.

The object of my invention is to provide a steam jacketed rendering tank having an inner corrugated shell that is intended to hold bones, meat, tallow, etc., from which grease and oil is to be rendered. This corrugated shell is in turn surrounded by a steam tight shell of ordinary cylindrical form, inclosing between the outer shell and the inner corrugated shell a small space in which live steam at high pressure may be admitted. The two shells are connected at top and bottom by annular plates so as to form steam tight joints between them at each end.

A further object of my invention is to construct the parts so as to obviate the necessity of stay bolts or any reinforcing device to prevent the inner corrugated shell from collapsing under pressure.

Further objects of my invention will be illustrated in the accompanying drawing and described and claimed in the accompanying specification.

In the accompanying drawings, the figure represents a side elevation of my improved rendering tank, partly broken away, to show the construction of the interior parts thereof.

In the accompanying drawings, like reference numerals refer to like characters.

My improved rendering tank consists of two shells, the inner shell 1 having the corrugated rings 2, 2 extending around it, and having plain cylindrical ends 3 at each end, one of which is shown in cross section and the other in side elevation. Outside of the corrugated inner shell is the plain cylindrical shell 4 which is of ordinary boiler construction. Between these shells at each end is placed the collar or ring 5 which is suitably perforated so that rivets 6 may pass therethrough and securely fasten the inner and outer shell and the ring 5 all together, making a steam tight joint therein. The outer shell is suitably perforated at 7 for the admission of live steam, and is also perforated at 8 to permit the draining off of the condensed water that may accumulate in the bottom of the steam space 9 provided between the inner and the outer shell. The ends of the inner shell are partly closed by the heads 10 and 11. These heads have the openings 12 and 13 therein, which openings may be closed by manhole covers or any other suitable device for the purpose of holding the charge in the rendering tank during the process of the reduction of the material.

The bottom of the rendering tank is closed in any suitable way and a charge is put into it of bones, etc., after which the top may be covered over, and live steam is admitted into the steam space 9 at any desired pressure, preferably that of about sixty pounds.

The internal diameter of the corrugated shell is preferably about thirty inches and a shell of such diameter under the pressure used would ordinarily collapse after comparatively short service unless held in place and strengthened and tied to the outer shell by means of stay bolts. By corrugating the shell in the manner shown, the stay bolts may be dispensed with and a strong, light construction free from perforations is secured, which is not only proof against collapsing at ordinary pressures, but on account of its smooth, uniform surface is easily cleaned and kept clean.

Having thus described my invention, what I claim as new and patentable is as follows:

The combination in a rendering tank of an inner shell having plain open cylindrical ends, annular corrugations in said shell intermediate said cylindrical ends, said shell showing a sinuous line in longitudinal section, a plain cylindrical shell outside of said inner shell, collars placed between said shells at each end of the inner shell and spacing said shells apart, said shells inclosing between them a steam tight space, perforations through the outer shell for the admission of steam into the space between said shells.

In testimony whereof I affix my signature in presence of two witnesses.

HERMAN F. BREHM.

Witnesses:
  MARGUERITE TEN EYCK,
  MARY D. TEN EYCK.